(12) United States Patent
Southerland et al.

(10) Patent No.: US 8,746,268 B2
(45) Date of Patent: Jun. 10, 2014

(54) COLLAPSIBLE WHEEL GUARD FOR STATIONARY BICYCLE

(76) Inventors: Brad Southerland, Wilmington, NC (US); Brad Forrest, Cary, NC (US)

( * ) Notice: Subject to any disclaimer, the term of this patent is extended or adjusted under 35 U.S.C. 154(b) by 0 days.

(21) Appl. No.: 13/450,685

(22) Filed: Apr. 19, 2012

(65) Prior Publication Data

US 2012/0266719 A1    Oct. 25, 2012

Related U.S. Application Data

(60) Provisional application No. 61/517,775, filed on Apr. 25, 2011.

(51) Int. Cl.
*E04H 15/40* (2006.01)
*E04H 15/58* (2006.01)

(52) U.S. Cl.
USPC .......................... 135/126; 135/117

(58) Field of Classification Search
USPC ............. 135/88.13, 88.03, 126, 117, 88.01, 135/88.09; 160/135, 351, 352
See application file for complete search history.

(56) References Cited

U.S. PATENT DOCUMENTS

| | | | |
|---|---|---|---|
| 1,714,550 A * | 5/1929 | Dreher | 160/233 |
| 1,751,807 A * | 3/1930 | Ford | 160/233 |
| 2,582,373 A * | 1/1952 | Cordrey | 126/299 C |
| 4,602,781 A | 7/1986 | La Marsh et al. | |
| 4,762,317 A | 8/1988 | Camfield et al. | |
| 4,824,102 A | 4/1989 | Lo | |
| 4,862,906 A * | 9/1989 | Jordon | 135/95 |
| 4,955,600 A | 9/1990 | Hoffenberg et al. | |
| 4,958,832 A | 9/1990 | Kim | |
| 5,290,212 A | 3/1994 | Metcalf | |
| 5,656,001 A | 8/1997 | Baatz | |
| 5,732,759 A * | 3/1998 | Wang | 160/370.21 |
| 5,901,725 A * | 5/1999 | Libby | 135/88.06 |
| 6,007,462 A | 12/1999 | Chen | |
| 6,109,281 A * | 8/2000 | Lowenthal | 135/125 |
| 6,711,854 B1 | 3/2004 | Andersen | |
| 6,860,839 B1 | 3/2005 | Dice et al. | |
| 7,083,551 B1 | 8/2006 | Lassanske et al. | |
| 7,178,792 B2 | 2/2007 | Monahan et al. | |
| 7,226,395 B2 | 6/2007 | Wu et al. | |
| 7,252,106 B2 * | 8/2007 | Conforti | 135/117 |
| 7,302,957 B2 * | 12/2007 | Ross | 135/126 |
| 7,347,216 B2 * | 3/2008 | Chuang | 135/88.13 |
| 7,530,930 B2 | 5/2009 | Liao et al. | |
| 7,766,798 B2 | 8/2010 | Hamilton | |
| 2002/0055422 A1 | 5/2002 | Airmet et al. | |
| 2004/0053750 A1 | 3/2004 | Forcillo | |
| 2004/0053751 A1 | 3/2004 | Pizolato | |
| 2005/0008992 A1 | 1/2005 | Westergaard et al. | |
| 2005/0209064 A1 | 9/2005 | Peterson et al. | |
| 2009/0025767 A1 * | 1/2009 | Zheng | 135/126 |

* cited by examiner

*Primary Examiner* — Noah Chandler Hawk
(74) *Attorney, Agent, or Firm* — MacCord Mason PLLC

(57) ABSTRACT

A collapsible guard adapted to cover the rear wheel of a stationery exercise bicycle supported on a bicycle trainer is described. The guard has side walls, an upper wall and a front opening sized to receive the bicycle rear wheel and trainer. In one embodiment of the invention, the guard includes spaced side walls having upper edges, front edges and lower edges; and a flexible upper wall with side edges, a front edge, and a rear edge, the side walls being releasibly attached along at least part of their lengths to the upper wall side edges, the upper wall curving downwardly from its front edge to its rear edge when the side walls are attached. In this embodiment, the side walls are foldable onto opposite faces of the upper wall. In another embodiment, the guard includes a collapsible frame with curved bands and a cover attachable over the frame.

15 Claims, 4 Drawing Sheets

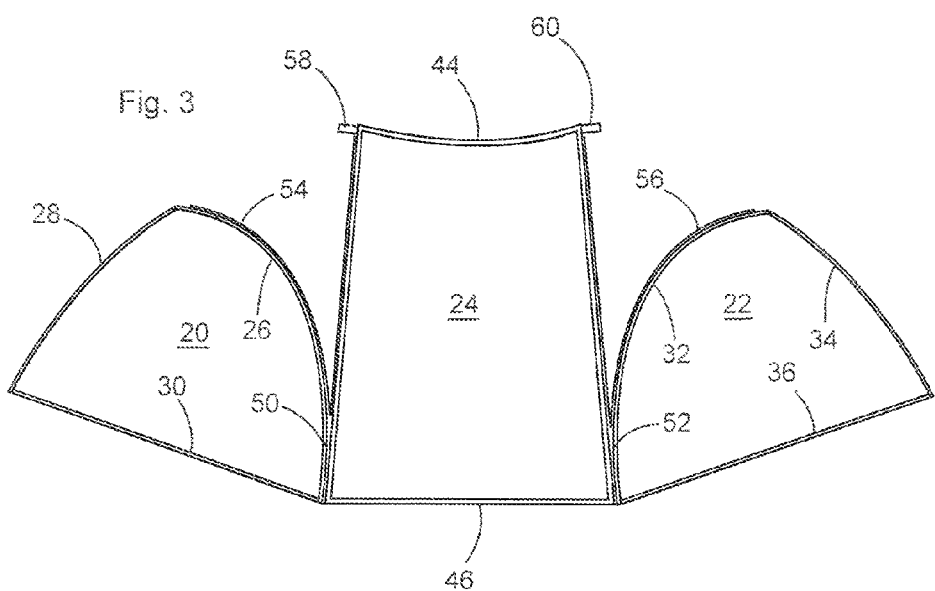
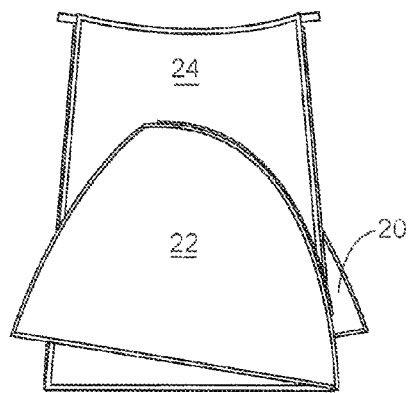
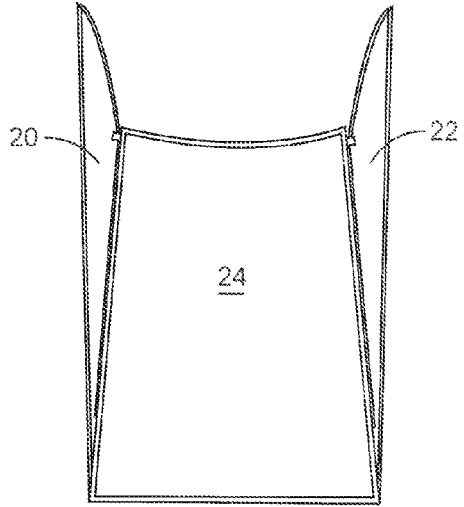

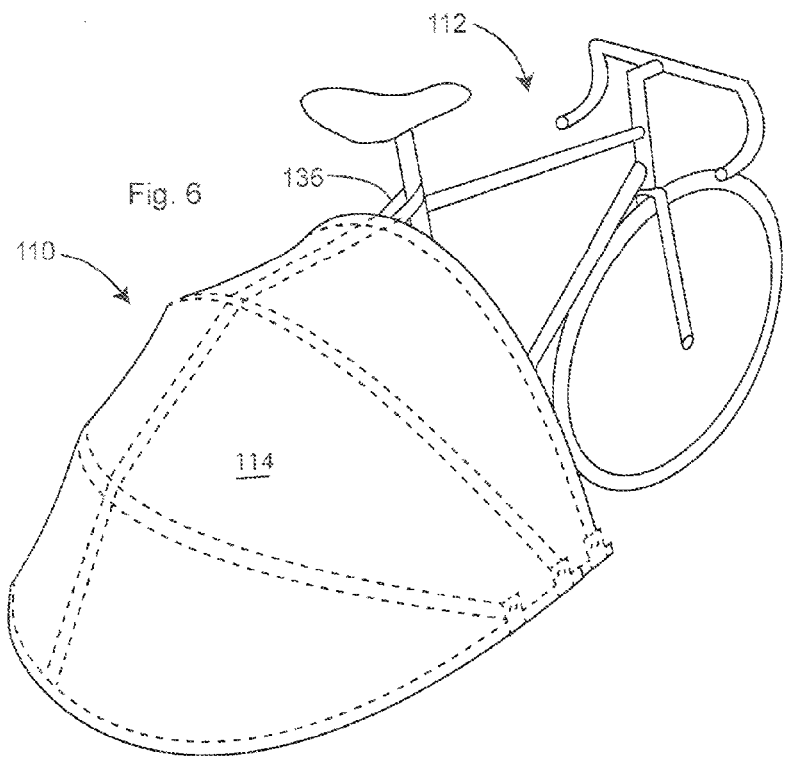
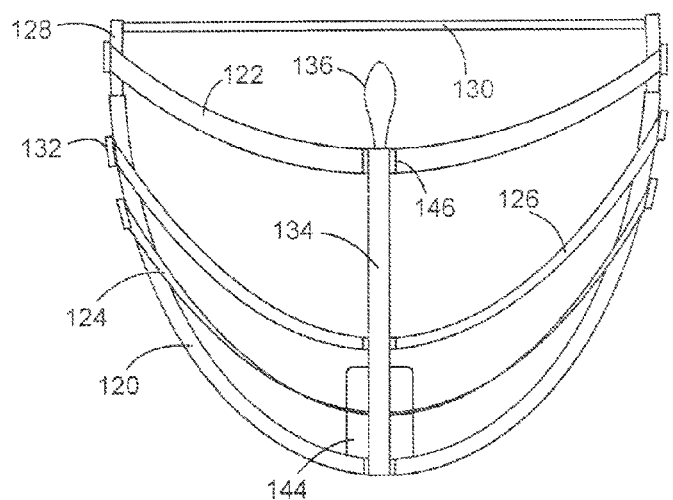

COLLAPSIBLE WHEEL GUARD FOR STATIONARY BICYCLE

This application claims the benefit of U.S. Provisional Patent Application No. 61/517,775, filed Apr. 25, 2011, which is incorporated herein by reference in its entirety.

BACKGROUND OF THE INVENTION

The present invention relates to a collapsible guard for the rear wheel of a stationary exercise bicycle and in particular to a collapsible wheel guard that can be positioned around the rear and sides of the rear wheel of a bicycle supported on a bicycle trainer to prevent children from injury caused by touching the bicycle wheel while it is turning.

DESCRIPTION OF THE PRIOR ART

Conventional bicycles are often used as stationary exercise and training apparatus by supporting the rear wheel of the bicycle on a bicycle trainer comprised of a support frame and a resistance unit that engages the Wheel to apply resistance upon rotation of the wheel, simulating the resistance experienced when normal riding the bicycle. Bicycles are commonly used with bicycle trainers in an indoor environment, such as the home, where small children nay be present.

During use, the spinning rear wheel of the bicycle presents a potential hazard to small children who may wander into the area where the exercise is taking place. With small children in particular, the spinning heel is an attraction tempting the child to touch the wheel, causing injury to the child, particularly if the child inserts his or her hand into the wheel spokes.

SUMMARY OF THE INVENTION

The present invention addresses this potential hazard by providing a collapsible guard that can be placed on either side and behind the rear wheel of a trainer supported bicycle, creating a barrier or shield between the wheel and a child that might contact the wheel. Generally, the guard is comprised of side and upper walls that are connected to each other, but which are adapted to collapse for compact storage when not in use.

The guard may be in the shape of a partial dome that extends from immediately behind the bicycle seat across from one side of the wheel to the other, and across the top and rear of the bicycle wheel. Preferably, attachments are provided to releasibly secure the guard to the bicycle adjacent the rear of the bicycle seat and to the exercise trainer.

One embodiment of the present wheel guard is comprised of spaced side panels and an intermediate upper panel that curves downwardly toward the rear to form the top and rear of the guard. The side panels, which are mirror images, each include an upper edge, a front edge, and a lower edge. The upper edges of the panels curve downwardly from the front to the rear of the panels. The front edges of the side panels may be convex, i.e., they may curve forward at their centers, to cover more of the bicycle, while the front edge of the upper panel can be concave, i.e., curve rearwardly toward its center, so that the guard can be moved further forward without interference by the bicycle seat and seat post.

The upper panel includes side edges, a front edge, and a rear edge. All panels are constructed of flexible, resilient, puncture resistant plastic or other sheet material, such as plastic sheet sold under the Coroplast trademark. The edges of the panels may be covered with cloth tape or other edging to improve the appearance of the panels and for use in attaching the panels to each other and to zippers as will be herein described.

Specifically the panels may be pivotally attached along rear sections of their upper edges by sewing together adjacent edging to the rear sections of upper panel side edges, thereby permanently secure the panels together while allowing the side panels to fold against opposed faces of the upper panel. For storage, one of the side panels can be folded against the upper surface of the upper panel, while the other side panel can be folded against the lower surface of the upper panel.

In order to assembly the panels into a guard for positioning over a bicycle rear wheel and trainer, the upper edges of the side panels are releasibly attached to side edges of the upper panel. As illustrated in the drawings, the side panels may be attached to the upper panel with zippers. To ensure that the zippers remain zipped during use, the guard may also include releasable tabs, e.g., hook-and-loop fasteners, adjacent the front edges of the panels and at the joinders of side panels to the upper panel.

In another embodiment, the guard is comprised of a frame that extends over the top, sides and rear of the wheel, and optionally the pedals, and a flexible covering that is supported by the frame. The frame is comprised of a resilient horizontal member that rests on the floor in a U-shape when the frame is erected, and a plurality of resilient curved bands that extend over the top of the bicycle rear wheel, with ends being hinged to the horizontal member on opposite sides of the bicycle.

When the frame is erected, the horizontal member is flexed to a U-shaped configuration that includes generally parallel side section its with rear and front ends positionable at either side of the bicycle, and a curved rear section having ends joined to the rear ends of the side sections. The front ends of the horizontal member side sections may be telescoping.

The bands include a front band having opposed ends hinged adjacent the front ends of the horizontal member, a rear band having opposed ends hinged intermediate the front ends of the horizontal band and the horizontal band rear section, and at least one intermediate band having opposed ends hinged to the horizontal member between the hinges of the front and rear bands.

In the erected position, the bands extend across the bicycle from one side of the bicycle to the opposite side, with the front and intermediate bands extending over the bicycle rear wheel, and the rear band extending behind the bicycle wheel.

In order to hold the erected frame in the desired position, the front of the frame, e.g., the front band, is attached to the bicycle near the rear of the bicycle seal, while the rear of the frame is attached to the bicycle trainer. A flexible connector, e.g., a cord or ribbon, is attached to the centers of the horizontal member and bands to maintain the horizontal member and bands in their desired orientations when the frame is erected. The horizontal member is held in the U-shaped configuration by a cord, preferably a bungee cord that ends between the front ends of the horizontal member and is sized to hold the sides of the horizontal member generally parallel to each other.

When the first connector is detached from the bicycle and the cord is detached from the end of the horizontal member, the hinged bands collapse rear zanily to lie adjacent each other and to the horizontal band, forming a compact array for ease in storage. The collapsed frame can be made even more compact by hinging the bands and the horizontal member at their centers, with the bands and horizontal member being folded together after being collapsed. Folding of the bands at their central hinges results in a compact package approximately one-half the length of the unflexed bands.

In order for the bands and horizontal member to lie adjacent each other, the bands are preferably of different lengths due to the distances of the band end hinges relative to the horizontal member center section. That is, the front band is longest since the front band hinges are the farthest from the horizontal member center section, with the rear band hinges being closest to the horizontal member center section. The lengths of intermediate bands are intermediate the lengths of the front and rear bands.

When in the erected position, the frame is covered with a flexible covering that extends over the bands, with the lower edge of the covering being adjacent the horizontal member. The bands and or the horizontal member can include attachment members, e.g., clips to secure the covering to the frame. The covering can be of various materials, e.g., cloth or plastic, so long as it has sufficient integrity to withstand penetration by a child.

In addition to the embodiments described, it will be understood that the invention envisions other structures that provide a barrier around the bicycle rear area. For example, an inflatable covering may be used, with the covering including inflatable sides and rear portions. The inflatable covering may be easily stored when deflated.

BRIEF DESCRIPTION OF THE DRAWINGS

FIG. 3 is a top view of the guard of FIG. 1 with the panels unzipped.

FIG. 4 is a top view of the guard of FIG. 1 with the side panels folded against opposite faces of the upper panel.

FIG. 5 is a top view of the erected guard of FIG. 1.

FIG. 6 is a rear perspective view of another embodiment of the wheel guard erected over the rear of bicycle.

FIG. 7 is a top view of the wheel guard of FIG. 6 without the cover.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
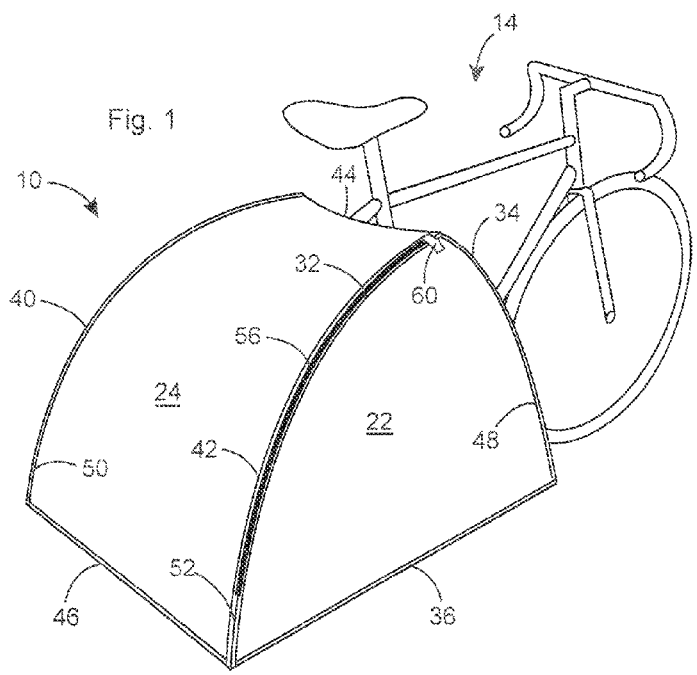
FIG. 1 is a rear perspective view of one embodiment of the wheel guard erected over the rear of a bicycle.
Figure 2:
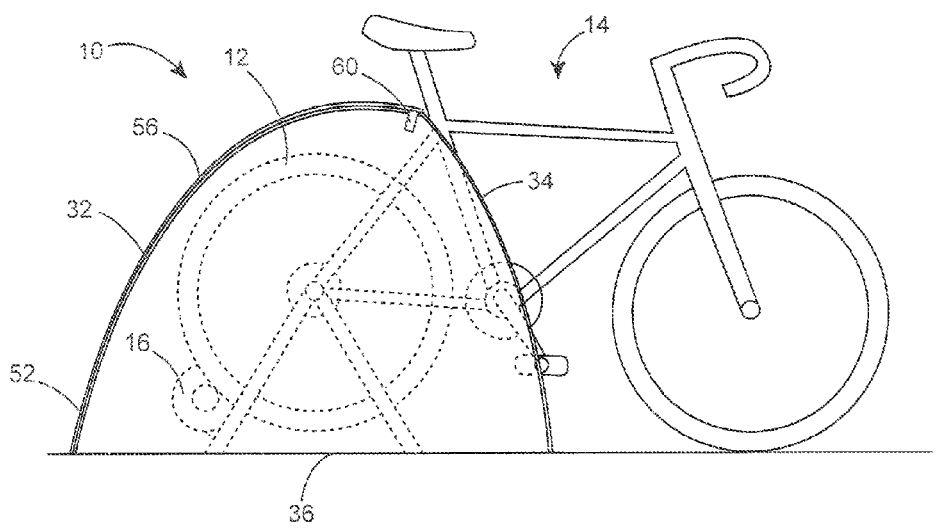
FIG. 2 is a side view of the wheel guard of FIG. 1 erected over the rear of a bicycle and a trainer.

As illustrated in FIGS. 1-5, one embodiment of the present wheel guard, generally 10, is designed to fit over rear wheel 12 of bicycle 14, which is supported on bicycle trainer 14. Guard 10 is comprised of spaced side panels 20 and 22, and an upper panel 24. Side panel 20 includes an upper edge 26, a front edge 28, and a lower edge 30. Side panel 22 is a mirror image of panel 20 and includes an upper edge 32, a front edge 34 and a lower edge 36. Upper edges 26 and 32 curve downwardly from the front to the rear of panels, 20 and 22, respectively.

Upper panel 24 includes side edges 40 and 42, a from edge 44 and a rear edge 46. All panels are constructed of flexible, resilient sheet material, such as plastic sheet, e.g., plastic sheet sold under the Coroplast trademark. Sheets made of other flexible, resilient material, such as pressure treated paper, are also contemplated. The edges of the panels in the preferred embodiment are bound with an edging 48. e.g., a cloth tape.

Panels 20 and 22 are pivotally attached along rear sections 50 and 52 of their upper edges, e.g., by sewing together of adjacent edging 48, to the rear sections of upper panel side edges 40 and 42 adjacent upper panel rear edge 46, to permanently secure the panels together, while allowing panels 20 and 22 to fold against panel 24. For storage, one of panels 20 and 22 can be folded against the upper surface of panel 24 while the other panel can be folded against the lower surface of panel 24.

In order to assemble panels 20, 22, and 24 into guard 10 to position over bicycle rear wheel 12 and trainer 16, upper edge 26 of panel 20 is releasably attached to edge 40 of upper panel 24 from rear section 50 to upper panel front edge 44, while upper edge 32 of panel 22 is releasably attached to side edge 42 of upper panel 24 from rear section 52 to upper panel front edge 44. As shown in the preferred embodiment, panel 20 is attached to panel 24 with zipper 54, while panel 22 is attached to panel 24 with zipper 56.

To ensure that zippers 54 and 56 remain zipped during use, guard 10 also includes releasable tabs 58 and 60 adjacent the front edges of the panels and at the joinders of panel 20 to panel 24, and panel 22 to panel 24. Tabs 58 and 60, which may be hook-and-loop fasteners, are attached after zippers 54 and 56 are zipped.

Figure 8:
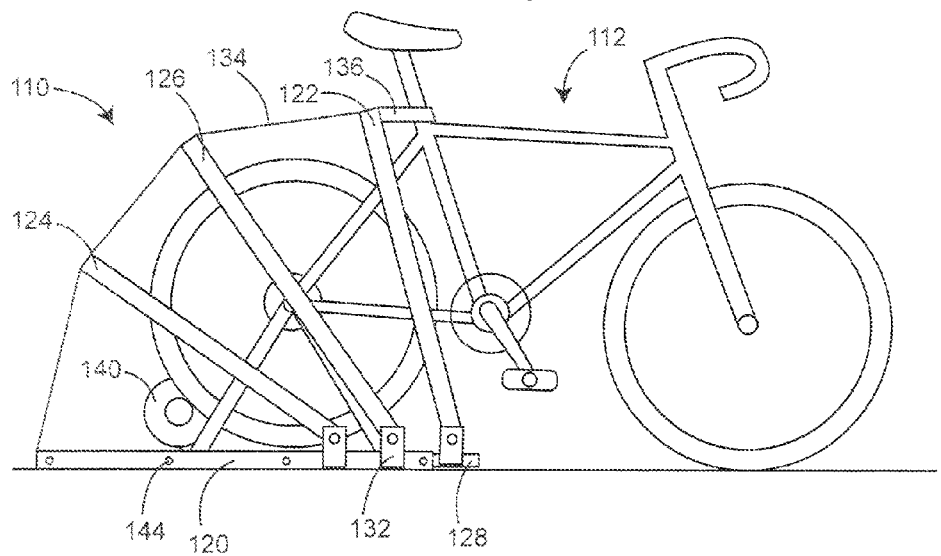
FIG. 8 is a side view of the wheel guard of FIG. 6 without the cover erected over the rear of a bicycle.
Figure 9:
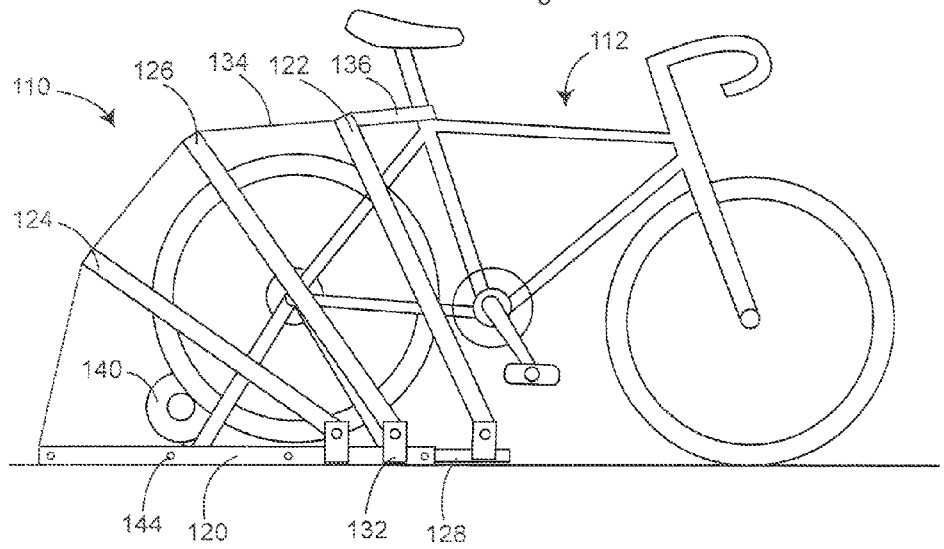
FIG. 9 is another side view of the wheel guard of FIG. 6 without the cover erected over the rear of the bicycle, and with the from ends of the frame extended to cover more of the bicycle.

As illustrated in FIGS. 6-9, another embodiment of the present wheel guard, generally 110, is designed to fit over the rear of a bicycle, generally 112. Parts of bicycle 112 have been omitted for clarity of illustration. Guard 110 is comprised of cover 114 supported on a frame, generally 116, which is comprised of a base horizontal member 120, a front band 122, a rear band 124, and at least one intermediate band 126. Horizontal member 120 includes telescoping end sections 128. When frame 116 is erected, horizontal member 120 is held in a U-shaped configuration using an attachment cord 130, which is preferably a bungee cord, extending between the front ends of horizontal member 120.

Resilient bands 122, 124 and 126, are also held in a U-shape configuration by attachment of their opposed ends to opposite sides of horizontal member 120 by hinges 132. A cord or ribbon 134 is attached to the bands, preferably at their apexes, with the bands being at a predetermined spacing, to hold the bands in their raised positions relative to each other.

The front of guard frame 116 is held upright by retainer cord 136 which attaches the front of frame 116 to a part, e.g., the seat post, of bicycle 112. The rear of frame is secured relative to rear wheel supporting bicycle trainer 140, e.g., by pad 142, which is inserted beneath trainer 140. Cover 114 extends over bands 116 and is attached to horizontal member 120 with releasable attachment members 144 which may be, for example, hook and loop fasteners or clips. It is also contemplated that the covering may be permanently sewn or otherwise attached to the frame.

When guard 110 is no longer used, it can be collapsed for storage by removing cover 114, if releasably attached, and disconnecting cords 130 and 136. Bands 122, 124 and 126 then pivot rearwardly to lie alongside each other and horizontal member 120. If more compact storage is desired, frame bands 122, 124 and 126 and horizontal member 120 can be hinged with hinges 146 at their apexes so that the bands and horizontal member can be folded to about one-half of their length.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A three-panel collapsible guard adapted to cover the rear wheel of a stationary exercise bicycle supported on a bicycle trainer comprising:
   a) first and second spaced side panels, each of said panels having an upper edge, a front edge and a lower edge, the upper edges of the side panels curving downwardly from said side panel front edges; and
   b) a single intermediate upper panel having side edges, a front edge, and a rear edge, said side panel edges being permanently attached to said upper panel side edges along rear sections of said upper panel side edges adjacent said upper panel rear edge, and releasably attached to said upper panel side edges from said rear sections to said upper panel front edge, said upper panel continuously curving downwardly from said upper panel front edge to said upper panel rear edge to from the top and rear of the guard when said side panels are releasably attached to said upper panel.

2. The guard of claim 1, wherein the front edges of said side panels are convex.

3. The guard of claim 1, wherein the front edge of said upper panel curves rearwardly toward its center.

4. The guard of claim 1, wherein said upper panel has upper and lower surfaces, one of said side panels being foldable against said upper surface and the other of said panels being foldable against said lower surface when said side panels are not releasably attached to said upper panel.

5. The guard of claim 1, wherein the side edges of said upper and side panels are bound with cloth tape, adjacent tapes along said rear sections being bound together to permanently attach said upper panel side edges along rear sections of said upper panel side edges.

6. The guard of claim 1, further including releasable tabs adjacent the front edges of the panels at the joinders of the side panels to the upper panel.

7. The guard of claim 1, wherein said side panels are releasably attached to said upper panel with zippers.

8. The guard of claim 1, wherein said side and upper panels are constructed of resilient plastic sheet having outer surfaces covered with fabric.

9. A three-panel collapsible guard adapted to cover the rear wheel of a stationary exercise bicycle supported on a bicycle trainer comprising:
   a) first and second spaced side panels, each of said panels having an upper edge, a convex front edge and a lower edge, the upper edges of the side panels curving downwardly from said side panel front edges; and
   b) a single intermediate upper panel having side edges, a front edge that curves rearwardly toward its center, and a rear edge, said side panel upper edges being permanently attached to said upper panel side edges along rear sections of said upper panel side edges adjacent said upper panel rear edge, and releasably attached to said upper panel side edges from said rear sections to said upper panel front edge, said upper panel continuously curving downwardly from said upper panel front edge to said upper panel rear edge to form the top and rear of the guard when said side panels are releasably attached to said upper panel.

10. The guard of claim 9, wherein said upper panel has upper and lower surfaces, one of said panels being foldable against said upper surface and the other of said panels being foldable against said lower surface when said side panels are not releasably attached to said upper panel.

11. The guard of claim 9, wherein the side edges of said upper and side panels are bound with cloth tape, adjacent tapes along said rear sections being bound together to permanently attach said upper panel said edges along rear sections of said upper panel side edges.

12. The guard of claim 9, further including releasable tabs adjacent the front edges of the panels at the joinders of the side panels to the upper panel.

13. The guard of claim 9, wherein said side panels are releasably attached to said upper panel with zippers.

14. The guard of claim 9, wherein said side and upper panels are constructed of resilient plastic sheet having outer surfaces covered with fabric.

15. A three-panel collapsible guard adapted to cover the rear wheel of a stationary exercise bicycle supported on a bicycle trainer comprising:
   a) first and second spaced side panels, each of said panels having an upper edge, a convex front edge and a lower edge, the upper edges of the side panels curving downwardly from said side panel front edges;
   b) a single intermediate upper panel having side edges, a front edge that curves rearwardly toward its center, and a rear edge, said side panel upper edges being permanently attached to said upper panel side edges along rear sections of said upper panel side edges adjacent said upper panel rear edge, and releasably attached with zippers to said upper panel side edges from said rear sections to said upper panel front edge, said upper panel continuously curving downwardly from said upper panel front edge to said upper panel rear edge to form the top and rear of the guard when said side panels are releasably attached to said upper panel; and
   c) cloth tape binding the side edges of said upper and side panels, adjacent tapes along said rear sections being bound together to permanently attach said upper panel side edges along rear sections of said upper panel side edges, said side and upper panels being constructed of resilient plastic sheet having outer surfaces covered with fabric.

* * * * *